Nov. 18, 1924.  
P. M. YOUNG  
1,516,170  
CONVEYER OR ELEVATOR  
Filed Aug. 18, 1923
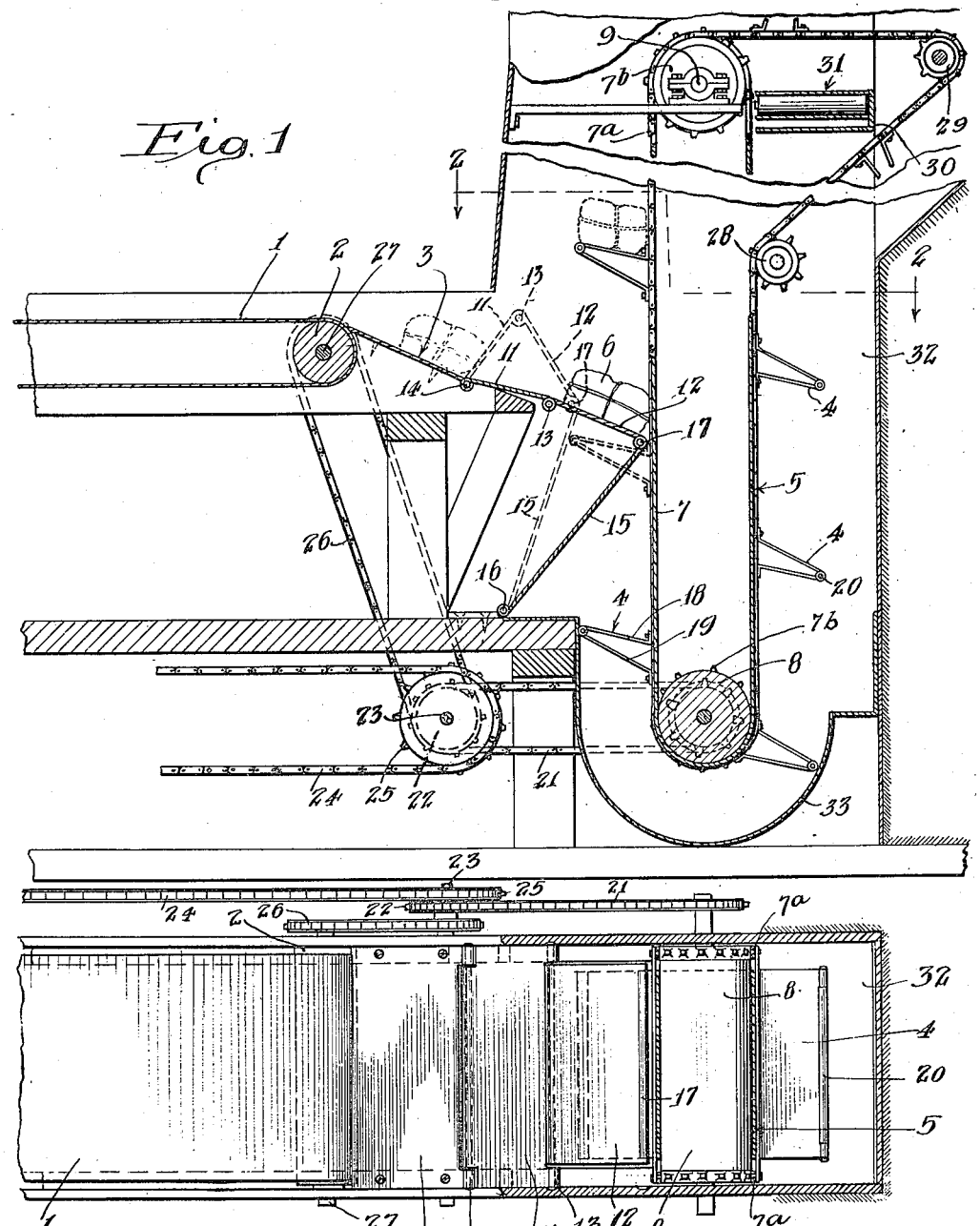

Patented Nov. 18, 1924.

1,516,170

UNITED STATES PATENT OFFICE.

PETER M. YOUNG, OF LOS ANGELES, CALIFORNIA.

CONVEYER OR ELEVATOR.

Application filed August 18, 1923. Serial No. 658,172.

*To all whom it may concern:*

Be it known that I, PETER M. YOUNG, a citizen of the United States, residing at Los Angeles, in the county of Los Angeles and State of California, have invented a new and useful Conveyer or Elevator, of which the following is a specification.

This invention relates to an article conveyer or elevator, such as used in markets, groceries, or other stores, for handling articles, such as packages or bundles. Such apparatus usually operates to receive the articles on one level and raises them to a delivery point at a higher level. The general object of the invention is to provide an article conveyer or elevator to which the articles may be fed automatically, and which will operate effectively to take the articles from the loading point and deliver them at a delivery point at a higher level. One of the objects of the invention is to provide a construction at the loading point which will operate to insure that the different carriers or holders on the elevator will not be overloaded, and operating incidentally to hold back for the next carrier, the other articles or packages which may have accumulated at the loading point.

One of the objects of the invention is to provide an apparatus of this general type which is capable of handling bundles of any size, that is to say, bundles having a wide range in size. I am aware that in elevator apparatus a loading platform may be constructed of slats which project into the path of carriers on an elevator, the said carriers being in the form of bars which project outwardly from the belt or endless chain and pass upwardly through the spaces between the slats of the loading platform. Such construction may be well adapted for handling large articles such as boxes or the like, but necessarily involves the presence of slots or openings in the loading platform; such slots render the apparatus ill-adapted for use with small articles. Furthermore, it is difficult to obtain a nice alinement between the parallel bars which form the carrier, and the slots; and of course, if one of these bars should be out of line with its slot it would strike the adjacent slot of the platform and cause a breakage to occur. My invention overcomes the disadvantages of a loading apparatus of such a construction, and enables packages ranging greatly in size to be effectively handled.

It is frequently necessary to provide for delivering the elevated articles onto another substantially horizontal conveyer at an upper floor or elevated point, and one of the objects of this invention is to provide simple means for accomplishing this.

In the operation of the elevator the articles may come to it in a closely crowded condition, and it may happen that in loading the articles onto the holders an article might fall by accident past the holder upon which it should be loaded. One of the objects of this invention is to provide means for insuring that such an article will be picked up by an article carrier or holder following the one upon which the article should have been loaded.

Further objects of the invention will appear hereinafter.

The invention consists in the novel parts and combination of parts to be described hereinafter, all of which contribute to produce an efficient article conveyer or elevator.

A preferred embodiment of the invention is described in the following specification while the broad scope of the invention is pointed out in the appended claims.

In the drawing:

Figure 1 is a vertical section through an article conveyer or elevator embodying my invention, certain parts being broken away.

Figure 2 is a plan and partial section on line 2—2 of Fig. 1.

In practice it is contemplated that the elevator will serve a plurality of counters on a floor, and for this purpose I provide a substantially horizontal conveyer belt 1 upon which a salesman or clerk at any counter may deposit the wrapped articles or packages that are to be delivered. At the delivery end of this conveyer 1, which passes around a suitable roller 2, I provide a loading platform 3 which supports the articles, and this loading platform is constructed so that it projects into the path of a plurality of carries or holders 4 carried on an endless flexible conveyer 5. As these holders 4 pass the loading platform 3, each holder takes the foremost article 6 or a number of such packages, from the loading platform and carries them up. The endless conveyer 5 preferably consists of an endless belt 7 which, if desired, may be disposed in a vertical position as shown, the lower end of the same passing around a lower roller 8, and the upper end passing around an upper roller of similar construction carried on an upper shaft 9. This belt 7 may be made of canvas or similar material. The carriers or holders 4 are preferably disposed equidistant from each other. The loading platform 3 is preferably movably mounted and is provided with means which is engaged by each holder as it passes the loading point, and cooperates with the holder to effect the displacement of the loading platform from the path of the holder, as it effects the delivery of the article from the loading platform to the holder. The loading platform is constructed with means operating in such a way that as this is accomplished it effects the delivery of the nearest article or articles on the lower part of the platform, to the belt 7 but holds back the other articles disposed on the platform, and prevents their falling down along the adjacent face of the conveyer.

In order to accomplish this I construct the platform of an upper plate 11 and a lower plate 12 connected together by a transverse pivotal joint or hinge 13, and the upper edge of the upper plate 11 is preferably held in place by a pivot or hinge joint 14. The lower edge of the lower plate 12 projects over quite near to the outer face of the belt 7. The plates 11 and 12 are supported in such a way that the joint 13 is displaced slightly upwardly above the bodies of the plates; in other words, this joint is normally "broken," so that if a force is applied to the lower edge of the lower plate 12 to force it back, the joint 13 will flex in an upward direction and permit the loading platform to be retracted out of the path of the holder. In order to accomplish this, I prefer to support the lower edge of the lower plate 12 on a cam-member which is in an inclined position, and may be in the form of an inclined plate 15, the lower edge of which is attached by a pivot connection 16 to a part of the frame-work, and the upper edge of this plate is attached by a hinge or pivot connection 17 to the outer edge of the lower plate 12.

The holders 4 are preferably constructed of two leaves 18 and 19, which may be in the form of plates, each plate being attached, at its inner edge to the flexible conveyer; in the present instance the elevator is constructed so as to deliver to a horizontal conveyer at a higher level, and in order to facilitate this mode of operation, I provide an endless sprocket chain 7ª at each side of the belt 7, passing over sprocket wheels 7ᵇ that are rigid with the rollers 8. The edges of the leaves 18 and 19 are attached to the chains 7ª at each end of the holders. The upper leaf 18 on the ascending side of the elevator forms an acute angle with the elevator and inclines downwardly toward its inner edge so that the action of gravity on an article or bundle placed on the holder will be to slide it inwardly; this feature assists in retaining it on the holder.

The flexibility of the leaves 18 and 19 with respect to each other is desirable in the rotation of the holders in passing around the rollers, such as the rollers 8 which are disposed at the upper and lower ends of the elevator, that is to say, the joints 20 by flexing, permit an opening or closing movement of the angle formed between the leaves 18 and 19; such a movement occurs when the part of the conveyer that carries a holder passes onto or off of the roller.

In the operation of the device, as one of the holders 4 ascends, it strikes the face of the cam member or plate 15 and shoves the same back toward the position indicated in dotted lines in Figure 1. This breaks the joint 13 upwardly and swings the plate 11 up into an inclined position in such a way that it holds back any articles on it and prevents their sliding onto the holder. As this movement takes place, the lower plate 12 is moved into an abnormally inclined position and this slides the outermost packages or package, such as the package 6, down onto the holder.

The lower roller 8 may be continuously driven by a horizontal sprocket chain 21 running from a sprocket wheel 22 on a shaft 23, which is driven by a sprocket chain 24 running over a sprocket wheel 25 carried by the shaft 23. This shaft 23 may also drive an upwardly inclined sprocket chain 26 which passes up and around a sprocket wheel on the shaft 27 of the roller 2; in this way the horizontal conveyer 1 may be driven.

Where it is desired to deliver the bundles from the elevator onto another conveyer or belt which may extend horizontally at an upper level, I provide a construction which will effect a separation of the belt 7 and the carriers at the location of the belt to which the elevator 5 delivers. This may be readily effected by providing guiding means such as sprocket wheels 28 and 29 disposed in such a way as to guide the chains 7ª in loops 30.

Through these loops a horizontal conveyer or endless belt 31 passes, its ends passing around rollers, not illustrated, one of which may be driven continuously to effect the movement of this belt. In this way the edge of the conveyer or belt 31 may be brought close up to the face of the belt 7 (see Fig. 1), so that as the carriers pass around the upper roller 8, the bundles carried by them will be delivered onto the belt 31.

The moving parts of the apparatus may be enveloped where necessary in a suitable sheet metal housing or casing 32, and the lower portion of this casing is formed into a semi-cylindrical drum or basin 33, the inner face of which lies near the outer edge of the bundle carriers as they pass around the lower roller 8. This part 33 operates as a catcher to catch any package or bundle which might fail to be caught by the bundle carrier, and accidentally fall down from the loading platform. If this catching basin 33 is present it will be evident that as the next bundle carrier comes around, it will pick up the lost bundle and carry it up.

It is understood that the embodiment of the invention described herein is only one of the many embodiments this invention may take and I do not wish to be limited in the practice of my invention nor in my claims to the particular embodiment set forth.

What I claim is:

1. In an article carrier or elevator, the combination of an endless conveyer having holders attached thereto and movable past a loading point, a loading platform for supporting the articles and having a plate projecting into the path of the holders, said loading platform being movably mounted and having means other than the said plate engaged by each holder as it passes the loading point and cooperating with the holder to displace the loading platform from the path of the holder and deliver the article from the loading platform to the holder.

2. In an article carrier or elevator, the combination of an endless conveyer having holders attached thereto and movable past a loading point, a loading platform for supporting the articles and projecting into the path of the holders, said loading platform having a joint extending transversely thereof enabling the loading platform to move into a retracted position out of the path of the holders, and means associated with the loading platform and cooperating with the holders to displace the loading platform from the path of the holders and transfer the article on the loading platform to each holder as it passes the loading point.

3. In an article carrier or elevator, the combination of an endless conveyer having holders attached thereto and movable past a loading point, a loading platform for supporting the articles and projecting into the path of the holders, said loading platform having a transverse joint enabling the platform to move out of the path of the holders, an inclined cam member pivotally attached to the outer end of the platform, projecting into the path of the holders and cooperating with each holder to displace the loading platform from the path of the holder and simultaneously transfer the article from it to the holder.

4. In an article carrier or elevator, the combination of an endless conveyer having holders attached thereto and movable past a loading point, a loading platform for supporting the articles and projecting into the path of the holders, said loading platform having an upper transverse joint and a lower transverse joint, and comprising an outer plate supported by the lower of said joints, said outer plate lying in the path of the holders and held in an inclined position so that an article upon it will rest against the face of the endless conveyer, and means carried by the said outer plate, lying in the path of the holders, and cooperating with each holder to displace the loading platform from the path of the holders and transfer an article upon it to the holder as it passes the loading point.

5. In an article carrier or elevator, the combination of an endless belt, rollers around which the ends of the belt pass, a sprocket wheel rigid with each roller, an endless sprocket chain lying substantially in the plane of the belt, passing around the sprocket wheels for rotating the rollers and effecting an advance of the endless belt, article holders attached at their inner ends to the endless chains, and projecting outwardly from the belt, a second conveyer comprising a belt disposed in a plane transverse to the plane of movement of the first named belt and with its edge disposed adjacent to the face of the first named belt and near the upper roller so as to receive the articles from the first named endless belt, and means for guiding said sprocket chains and holders away from the vicinity of the second named conveyer.

6. In an article carrier or elevator, the combination of an endless belt, rollers around which the ends of the belt pass, a sprocket wheel rigid with each roller, an endless sprocket chain consisting of two upright, substantially parallel runs passing around the sprocket wheels for rotating the rollers and effecting an advance of the endless belt, article holders attached to the endless chains, a second conveyer comprising a belt disposed in a plane transverse to the plane of movement of the first named belt and with its edge disposed adjacent to the face of the first named belt on the descending side thereof, and near the upper roller so as to receive the articles from the first named endless belt, a pair of guiding sprocket wheels, disposed in a laterally displaced position with respect to the first named endless conveyer, and over which the chain passes so as to form a loop extending laterally from the upper part of the elevator, and passing around the second conveyer.

7. In an article carrier or elevator, the combination of a substantially vertical endless conveyer having holders attached thereto and movable past a loading point, a loading platform for supporting the articles and projecting in an inclined position into the path of the holders at a point where they move in a vertical direction, said loading platform being movably mounted and having means engaged by each holder as it passes the loading point and cooperating with the holder to displace the loading platform from the path of the holder and deliver the article from the loading platform to the holder, each of said holders consisting of a pair of leaves attached at their inner ends to the conveyer and having a joint connection connecting the leaves at their outer ends, the upper leaf on the ascending side of the endless conveyer forming an acute angle with the conveyer and inclining downwardly toward the conveyer so as to cooperate with the conveyer in holding the articles.

8. In an article carrier or elevator, the combination of a substantially vertical endless conveyer, means having a flexible member with holders attached thereto and movable past a loading point, a loading platform for the articles projecting downwardly into the path of the holders, said loading platform being movably mounted, and having means engaged by each holder as it passes the loading point, to cooperate with the holder to effect the transfer of the article from the platform to the holder, each of said holders consisting of an upper leaf attached at its inner end to the flexible member and a lower leaf attached at its inner end to the flexible member with a joint connection connecting the outer ends of the leaves, rollers for the ends of the conveyer means, the upper leaf of each holder on the ascending side of the conveyer inclining downwardly toward the flexible member for retaining the article on the holder.

9. In an article elevator, the combination of an endless conveyer, a plurality of holders carried thereby, a movable loading platform cooperating with the holders to transfer articles from the lower part of the platform to the holders as they pass, and having means actuated by the holders to hold back the articles on the upper part of the loading platform, and preventing the articles from falling down the adjacent face of the conveyer, a lower roller around which the lower end of the conveyer passes, an upper roller around which the upper end of the conveyer passes, and a casing enveloping the lower end of the conveyer and having a wall conforming to the path of movement of the holders, said casing cooperating with the holders to enable the same to pick up an article which may have fallen into the same from the loading platform.

Signed at Los Angeles, California, this 1st day of August, 1923.

PETER M. YOUNG.